US009606264B1

(12) United States Patent
Menon et al.

(10) Patent No.: US 9,606,264 B1
(45) Date of Patent: Mar. 28, 2017

(54) INHIBITING DISPLAY DISCOLORATION (71) Applicant: Amazon Technologies, Inc., Reno, NV (US)

(72) Inventors: Anoop Menon, Capitola, CA (US); Chin Siong Khor, Singapore (SG); Robert Waverly Zehner, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 13/926,793

(22) Filed: Jun. 25, 2013

Related U.S. Application Data (60) Provisional application No. 61/803,731, filed on Mar. 20, 2013.

(51) Int. Cl.
*F21V 9/06* (2006.01)
*G02B 1/10* (2015.01)
*G02B 5/20* (2006.01)
*G02B 5/22* (2006.01)

(52) U.S. Cl.
CPC ............... *G02B 1/105* (2013.01); *G02B 5/20* (2013.01); *G02B 5/208* (2013.01); *G02B 5/22* (2013.01)

(58) Field of Classification Search
CPC . G02B 5/208; G02B 5/22; G02B 5/20; G02B 5/281; G02B 1/105; G02B 1/12; B32B 17/10678; B32B 37/12; B32B 2037/1253; B32B 2310/0831; B32B 37/1284; B32B 37/18; B32B 2457/20; B32B 2551/00; B32B 7/12; B32B 2038/0076; B32B 2457/208; B32B 2310/0825; B29C 66/71; B29C 65/14; B29C 65/1406; B29C 65/1412; B29C 65/48; B29C 65/4845; F21V 9/06
See application file for complete search history.

(56) References Cited

U.S. PATENT DOCUMENTS

| 4,950,638 A * | 8/1990 | Yuyama ................. B41M 5/30 427/152 |
| 2002/0067547 A1* | 6/2002 | Epstein et al. .............. 359/606 |
| 2003/0025855 A1* | 2/2003 | Holman et al. ............... 349/86 |

(Continued)

FOREIGN PATENT DOCUMENTS

WO   WO 2012068543 A1 *  5/2012  .............. G02B 6/30

*Primary Examiner* — Bumsuk Won
*Assistant Examiner* — Balram Parbadia
(74) *Attorney, Agent, or Firm* — Lee & Hayes, PLLC (57) ABSTRACT

An electronic device includes a display for rendering content. The display may include a protective sheet that is located between an image-displaying component and a liquid optically clear adhesive (LOCA) that adheres another component layered atop the display, such as a front light, a touch sensor or a cover layer. In some cases, the protective sheet may be a polymer sheet coated with a layer of ceramic material that prevents migration of a reactive species, such as a photoinitiator, between the protective sheet and the LOCA. Alternatively, a plasma treatment, a UV-light-ozone treatment, or a thermal treatment may be applied to the protective sheet to remove material including the reactive species and/or form a barrier layer to prevent migration of the reactive species. Still alternatively, the protective sheet may be a thin flexible glass sheet that does not include constituents that interact with the LOCA.

21 Claims, 6 Drawing Sheets

(56) References Cited

U.S. PATENT DOCUMENTS

2005/0089650 A1\* 4/2005 Tanaka et al. .................. 428/1.1
2007/0109219 A1\* 5/2007 Whitesides et al. ............ 345/55
2008/0254272 A1\* 10/2008 Danner et al. ................. 428/220

\* cited by examiner

INHIBITING DISPLAY DISCOLORATION

CROSS-REFERENCE TO RELATED APPLICATION

This application claims the benefit of U.S. Provisional Patent Application No. 61/803,731, filed Mar. 20, 2013, which is incorporated by reference herein in its entirety.

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display can affect the user's experience with the electronic device and the content presented thereon. Accordingly, finding ways to enhance user experience and satisfaction continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, electronic devices that include displays for presenting content and other information. In some examples, the electronic device may also include one or more additional components associated with the display, such as a touch sensor component layered atop the display for detecting touch inputs, a front light or back light component for lighting the display, and/or a cover layer component, which may include antiglare properties, antireflective properties, anti-fingerprint properties, anti-cracking properties, and the like. This disclosure also includes techniques for assembling electronic devices including the displays and other features described herein in a manner that prevents, reduces or otherwise inhibits discoloration of the display and/or components assembled to the display.

In some examples, the display may include, or may have associated therewith, an outer layer or protective sheet applied during manufacture of the display. The protective sheet is a transparent sheet that overlies and protects an image-displaying component of the display such that the image-displaying component is viewable through the protective sheet. When assembling an electronic device, one or more additional components may be stacked on top of or otherwise coupled to the protective sheet to produce a display assembly of the electronic device. In some cases, the one or more additional components are coupled to the protective sheet by a liquid optically clear adhesive (LOCA) that adheres the additional component(s) to the protective sheet. The LOCA may be cured through photo initiation using ultraviolet (UV) light. In some conventional display assemblies, exposure of the conventional display assembly to UV light over a period of time may result in yellowing or other discoloration. For example, leaving a device in direct sunlight for a period of time may cause photoinitiators or other reactive species to migrate between the protective sheet and the LOCA. The migration of the reactive species from one material to the other may cause yellowing or other discoloration of at least one of the LOCA or the protective sheet.

Accordingly, in some implementations, to prevent discoloration of the LOCA and/or the protective sheet, a treatment, such as a surface treatment that reduces or inhibits discoloration, may be applied to the protective sheet. As one example, an outer surface of the protective sheet that will contact the LOCA may be coated with an optically transparent ceramic layer. The ceramic layer acts as a barrier to inhibit interaction between the LOCA and the material of the protective sheet. For instance, the ceramic layer may be applied directly to the protective sheet using any suitable techniques, such as sputtering, vapor deposition, or the like. The ceramic layer prevents migration of photoinitiators and/or other reactive species from the protective sheet to the LOCA and vice versa. In some examples, the ceramic layer is applied to the protective sheet after assembly of the protective sheet with the display. Alternatively, the ceramic layer may be applied to the protective sheet in advance of assembly of the protective sheet with the display.

As another example, the outer surface of the protective sheet that will contact the LOCA may be treated using surface energy activation techniques such as plasma surface treatment, ultraviolet-light-ozone treatment, or thermal treatment to remove material including surface-located reactive species and/or produce a barrier layer on the surface of the protective sheet to inhibit interaction between the LOCA and the material of the protective sheet. For example, plasma surface treatment may be used to clean the surface of the protective sheet and/or produce an oxide barrier layer on the surface of the protective sheet. Alternatively, UV-light-ozone treatment with UV light sources may be used to clean the surface of the protective sheet and/or create an oxide layer as the barrier layer on the surface of the protective sheet. As still another example, heat treatment or thermal treatment of the outer surface of the protective sheet, such as with a pulsed laser or other suitable technique, may be used to clean the surface of the protective sheet and/or create a oxide layer that acts as the barrier layer for preventing transfer of photoinitiators or other reactive species, between the LOCA and the protective sheet material. As still another example, rather than using a polymeric protective sheet, the protective sheet may be constructed as an ultrathin flexible glass barrier and that does not include a reactive species on an outer surface.

Figure 1:
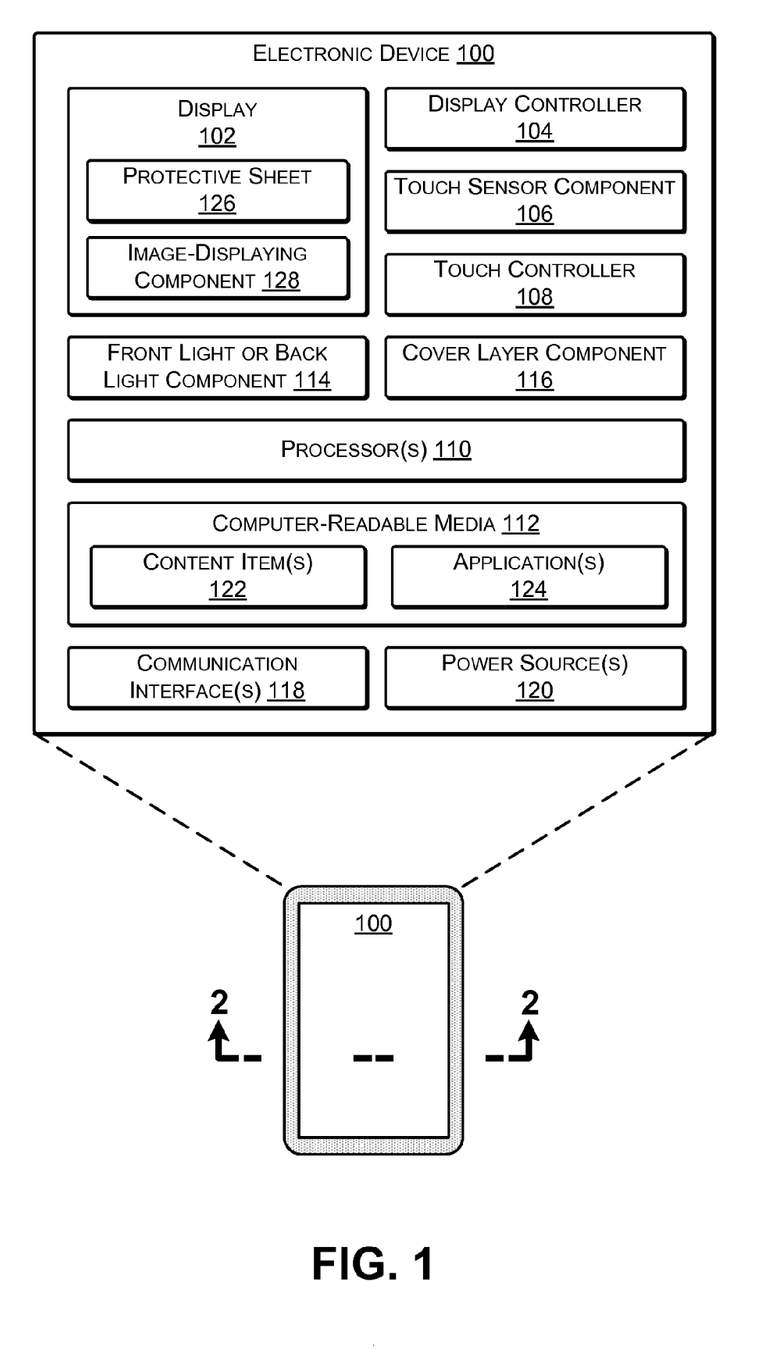
FIG. 1 illustrates an example electronic device that includes a display assembly configured to inhibit discoloration according to some implementations.

FIG. 1 illustrates an example electronic device 100 that may include the example display assemblies discussed above. The device 100 may comprise any type of electronic device having a display. For instance, the device 100 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 100 may be a non-mobile electronic device (e.g., a computer display, a television, etc.). In addition, while FIG. 1 illustrates several example components of the electronic device 100, it is to be appreciated that the device 100 may also include other conventional components, such as an operating system, system busses, input/output components, and the like. Further, in other examples, such as in the case of a television or computer monitor, the electronic device 100 may only include a subset of the components shown.

Regardless of the specific implementation of the electronic device 100, the device 100 includes a display 102 and a corresponding display controller 104. The display 102 may represent a reflective display in some instances, such as an electronic paper display, a reflective LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 102 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 100, the display 102 may be an active display such as a liquid crystal display, a plasma display, a light emitting diode display, an organic light emitting diode display, and so forth. Accordingly, implementations herein are not limited to any particular display technology.

In one implementation, the display 102 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the display absorbs the incident light and, hence, causes the pixel to appear black to a viewing user. In addition, the particles may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display 102 comprises an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller 104 may utilize different arrays of both light and dark particles. In some cases, the particles may be contained in tiny individual transparent capsules, such as approximately 40 micrometers in diameter. The capsules are suspended in a fluid, such as a liquid polymer, between a transparent upper electrode grid layer and a lower electrode grid layer separated by a gap, such as approximately 50-200 micrometers.

In still another implementation, the display comprises an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 102 may represent a backlit display, examples of which are mentioned above.

In addition to including the display 102, FIG. 1 illustrates that some examples of the device 100 may include a touch sensor component 106 and a touch controller 108. In some instances, at least one touch sensor component 106 resides with, or is stacked on, the display 102 to form a touch-sensitive display (e.g., an electronic paper touch-sensitive display). Thus, the display 102 may be capable of both accepting user touch input and rendering content in response to or corresponding to the touch input. As several examples, the touch sensor component 106 may comprise a capacitive touch sensor, a force sensitive resistance (FSR), an interpolating force sensitive resistance (IFSR) sensor, or any other type of touch sensor. In some instances, the touch sensor component 106 is capable of detecting touches as well as determining an amount of pressure or force of these touches.

FIG. 1 further illustrates that the electronic device 100 may include one or more processors 110 and one or more computer-readable media 112, as well as a front light component 114 (which may alternatively be a backlight component in the case of a backlit display) for lighting the display 102, a cover layer component 116, such as a cover glass or cover sheet, one or more communication interfaces 118 and one or more power sources 120. The communication interfaces 118 may support both wired and wireless connection to various networks, such as cellular networks, radio, WiFi networks, short range networks (e.g., Bluetooth®), infrared (IR), and so forth.

Depending on the configuration of the electronic device 100, the computer-readable media 112 (and other computer-readable media described throughout) is an example of computer storage media and may include volatile and non-volatile memory. Thus, the computer-readable media 112 may include, but is not limited to, RAM, ROM, EEPROM, flash memory, or other memory technology, or any other medium that can be used to store computer-readable instructions, programs, applications, media items, and/or data which can be accessed by the electronic device 100.

The computer-readable media 112 may be used to store any number of functional components that are executable on the processor 110, as well content items 122 and applications 124. Thus, the computer-readable media 112 may include an operating system and a storage database to store one or more content items 122, such as eBooks, audio books, songs, videos, still images, and the like. The computer-readable media 112 of the electronic device 100 may also store one or more content presentation applications to render content items on the device 100. These content presentation applications may be implemented as various applications 124 depending upon the content items 122. For instance, the content presentation application may be an electronic book reader application for rending textual electronic books, an audio player for playing audio books or songs, a video player for playing video, and so forth.

In some instances, the electronic device 100 may couple to a cover (not shown in FIG. 1) to protect the display (and other components in the display stack or display assembly) of the device 100. In one example, the cover may include a back flap that covers a back portion of the device 100 and a front flap that covers the display 102 and the other components in the stack. The device 100 and/or the cover may include a sensor (e.g., a hall effect sensor) to detect when the cover is open (i.e., when the front flap is not atop the display and other components). The sensor may send a signal to the front light component 114 when the cover is open and, in response, the front light component 114 may illuminate the display 102. When the cover is closed, meanwhile, the front light component 114 may receive a signal indicating that the cover has closed and, in response, the front light component 114 may turn off.

Furthermore, the amount of light emitted by the front light component 114 may vary. For instance, upon a user opening the cover, the light from the front light may gradually increase to its full illumination. In some instances, the device 100 includes an ambient light sensor (not shown in FIG. 1) and the amount of illumination of the front light component 114 may be based at least in part on the amount of ambient light detected by the ambient light sensor. For example, the front light component 114 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 102 may vary depending on whether the front light component 114 is on or off, or based on the amount of light provided by the front light component 114. For instance, the electronic device 100 may implement a larger default font or a greater contrast when the light is off compared to when the light is on. In some instances, the electronic device 100 maintains, when the light is on, a contrast ratio for the display that is within a certain defined percentage of the contrast ratio when the light is off.

As described above, the touch sensor component 106 may comprise a capacitive touch sensor that resides atop the display 102. In some examples, the touch sensor component 106 may be formed on or integrated with the cover layer component 116. In other examples, the touch sensor component 106 may be a separate component in the stack of the display assembly. The front light component 114 may reside atop or below the touch sensor component 106. In some instances, either the touch sensor component 106 or the front light component 114 is coupled by LOCA to a top surface of a protective sheet 126 of the display 102. As one example, the front light component 114 may include a lightguide sheet and a light source (not shown in FIG. 1). The lightguide sheet may comprise a substrate (e.g., a transparent thermoplastic such as PMMA or other acrylic), a layer of lacquer and multiple grating elements formed in the layer of lacquer that function to propagate light from the light source towards the display 102, thus illuminating the display 102.

The cover layer component 116 may include a transparent substrate or sheet having an outer layer that functions to reduce at least one of glare or reflection of ambient light incident on the electronic device 100. In some instances, the cover layer component 116 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3$h$ pencil). Without such scratch resistance, a device may be more easily scratched and a user may perceive the scratches from the light that is dispersed over the top of the reflective display. In some examples, the protective sheet 126 may include a similar UV-cured hard coating on the outer surface. The cover layer component 116 may couple to another component or to the protective sheet 126 of the display 102. The cover layer component 116 may, in some instances, also include a UV filter, a UV-absorbing dye, or the like, for protecting components lower in the stack from UV light incident on the electronic device 100. In still other examples, the cover layer component 116 may include a sheet of high-strength glass having an antiglare and/or antireflective coating.

The display 102 includes the protective sheet 126 overlying an image-displaying component 128. For example, the display 102 may be preassembled to have the protective sheet 126 as an outer surface on the upper or image-viewing side of the display 102. Accordingly, the protective sheet 126 may be integral with and may overlie the image-displaying component 128. The protective sheet 126 may be optically transparent to enable a user to view, through the protective sheet 126, an image presented on the image-displaying component 128 of the display 102.

In some examples, the protective sheet 126 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 126 may include a coating, such as the hard coating described above. For instance, the hard coating may be applied to the outer surface of the protective sheet 126 before or after assembly of the protective sheet 126 with the image-displaying component 128 of the display 102. In some examples, the hard coating may include a photoinitiator or other reactive species in its composition, such as for curing the hard coating on the protective sheet 126. Furthermore, in some examples, the protective sheet 126 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 126, thereby protecting the image-displaying component 128 from UV light.

In some cases, the protective sheet 126 may include one or more photoinitiators such as in an outer hard coating, in the UV-absorbing dye, or in another constituent. Several examples of such photoinitiators include 1-hydroxycyclohexyl phenyl ketone; 2-hydroxy-1-[4-(2-hydroxyethoxy) phenyl]-2-methyl-1-propanone; 2-methyl-1-[4-(methylthio) phenyl]-2-(4-morpholinyl)-1-propanone; 2-benzyl-2-(dimethylamino)-1-(4-morpholinophenyl)-1-butanone; 2,4,6-trimethylbenzoyl) diphenylphosphine oxide; and bis(2,6-dimethoxybenzoyl)(2,4,4-trimethylpentyl)phosphine oxide. The photoinitiator may interact with the LOCA to cause discoloration of at least one of the protective sheet or the LOCA. The surface treatments described herein may inhibit such discoloration, either by blocking interaction with the photoinitiator, or by removing material including the photoinitiator from the surface of the protective sheet. In other examples, according some implementations herein, the protective sheet may be replaced with or augmented with a thin glass sheet that does not include the photoinitiator or other reactive species.

According to some implementations herein, one or more of the components discussed above may be coupled to the display 102 using a liquid optically clear adhesive (LOCA). For example, suppose that the light guide portion of the front light component 114 is to be coupled to the display 102. The light guide may be coupled to the display 102 by placing the LOCA on the outer or upper surface of the protective sheet 126. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 114 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 114. In other implementations, the LOCA may be placed near a center of the protective sheet 126, and pressed outwards towards a perimeter of the top surface of the protective sheet 126 by placing the front light component 114 on top of the LOCA. The LOCA may then be cured by directing UV light through the front light component 114. As discussed above, and as discussed additionally below, various techniques, such as surface treatment of the protective sheet, may be used to prevent discoloration of the LOCA and/or the protective sheet 126.

While FIG. 1 illustrates a few example components, the electronic device 100 may have additional features or functionality. For example, the device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 100 may reside remotely from the device 100 in some implementations. In these implementations, the device 100 may utilize the communication interfaces 118 to communicate with and utilize this functionality.

Figure 2:
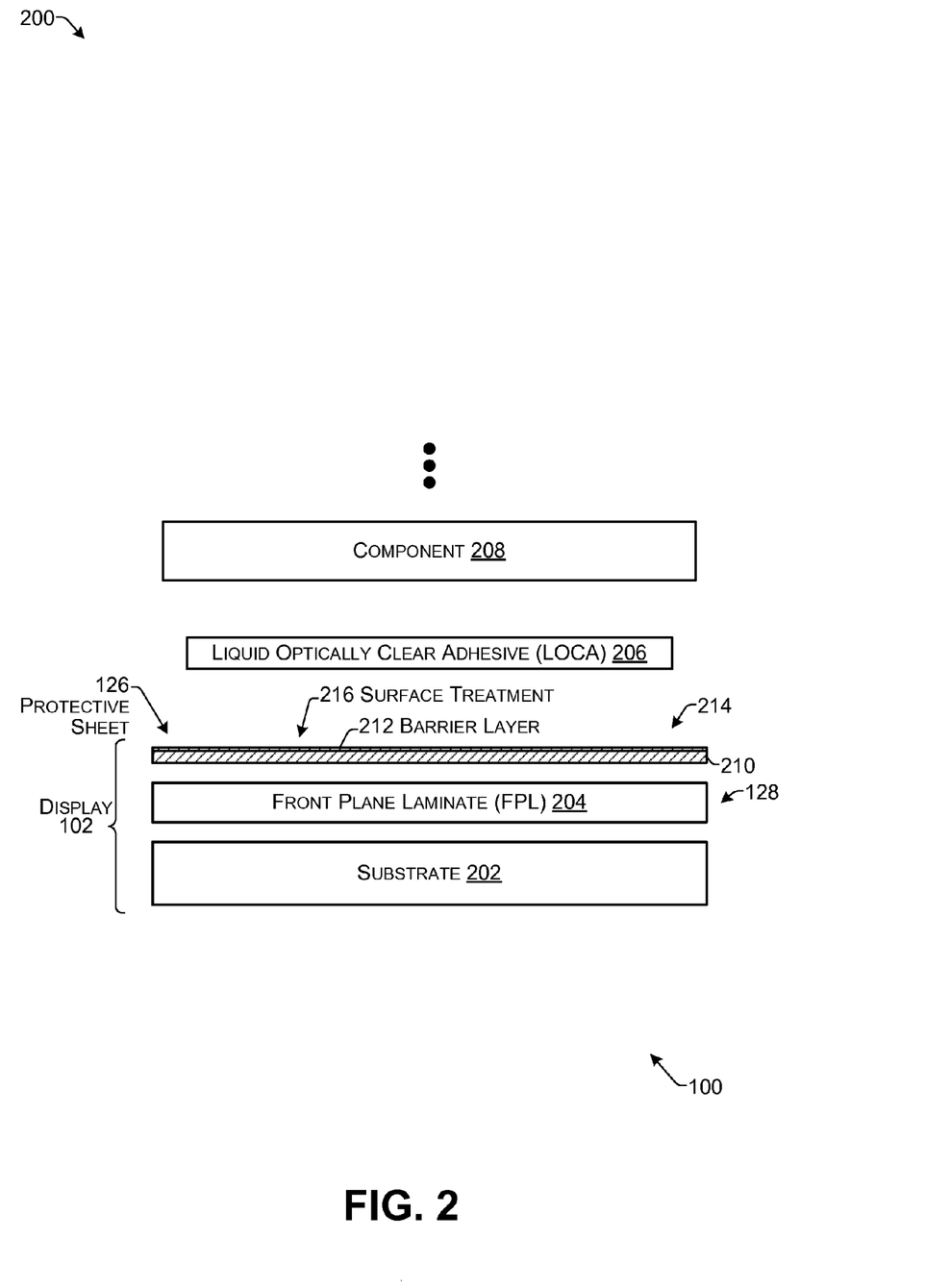
FIG. 2 illustrates an example schematic cross-section of the display assembly taken along line 2-2 of FIG. 1 according to some implementations.

FIG. 2 illustrates an example of a schematic cross-section of a component stack of a display assembly 200 of the electronic device 100 taken along line 2-2 from FIG. 1. A housing of the device 100 and other components of the device 100 described above are omitted from this figure for the sake of clarity of illustration. As illustrated, in this example the display 102 includes a substrate 202, such as of glass or other suitable material, and a front plane laminate (FPL) 204, which serves as the image-displaying component 128. In some instances, the FPL 204 comprises e-ink capsules, as well as a fluid in which the capsules move up or down, as described above with reference to electronic-paper displays. In addition, the FPL 204 may include a plastic film structure onto which the e-ink is coated using a roll-to-roll process. Thereafter, a conductive transparent electrode plastic film may be combined with an adhesive layer and a release sheet to form one implementation of the FPL 204. As another example, the FPL 204 may include a plurality of pixel elements (not shown in FIG. 2), each containing liquid subject to electrowetting activation. For example, voltage may be applied to individual pixel elements to modify the surface tension of the liquid and thereby change the appearance of the pixel element.

The protective sheet 126 may reside atop the FPL 204, so that the FPL 204 is sandwiched between the protective sheet 126 and the substrate 202. Thus, elements of the display 102, including the protective sheet 126, the FPL 204, and the substrate 202 may be assembled or otherwise coupled together to form the display 102. For instance, the elements may be laminated together. Alternatively, a mechanical technique, such as an edge bezel, or other suitable method may be used for assembling the elements of the display 102.

To produce the display assembly 200 for the electronic device 100, liquid optically clear adhesive (LOCA) 206 may be placed atop the protective sheet 126. As described above, during assembly, the LOCA 206 may be deposited onto the protective sheet 126 and, when the LOCA 206 reaches the corners of the protective sheet 126, the corners may be UV-cured. Thereafter, the LOCA 206 on the remaining portion of the protective sheet 126 may be UV-cured with a component 208 placed on the LOCA 206, such that the cured LOCA 206 couples and adheres the component 208 to the protective sheet 126 of the display 102. The component 208 may be any of the components 106, 114, 116, discussed above, or any other suitable component that may be included on top of the display 102 as part of the display assembly 200.

The LOCA 206 may be formed from silicone and/or an acrylic material. As one example, the LOCA may comprise Loctite® 5192™, an optically transparent UV-curable silicone-based adhesive available from Henkel AG & Co. KGaA of Dusseldorf, Germany. In some examples, the LOCA 206 may include a photoinitiator to facilitate UV curing. Examples of photoinitiators include cationic photoinitiators such as organic iodonium or sulfonium salts. The LOCA layer may be applied to a surface such a by rolling using a wet coating method or other suitable technique, followed by UV curing (e.g., using a fusion lamp).

In the example of FIG. 2, the protective sheet 126 includes a sheet substrate 210, which may be any of the materials discussed above. A coating or barrier layer 212 may be disposed on an outer surface 214 of the protective sheet 126 as a surface treatment 216. As mentioned above, in some examples, applying the surface treatment 216 to the protective sheet 126 includes coating the protective sheet 126 on at least the outer surface 214 of the protective sheet 126 with a ceramic material that serves as the barrier layer 212. Examples of suitable ceramic materials include aluminum oxide, silicon oxide, silicon nitride, titanium oxide, magnesium oxide, or any suitable ceramic material that is optically clear in a thin layer as described herein. For instance, the barrier layer 212 may be applied using chemical or physical vapor deposition, sputtering, or other suitable techniques, either before or after the protective sheet 126 has been assembled to the display 102. The ceramic coating is applied as the barrier layer 212 in a layer that is sufficiently thin, e.g., on the order of 50 nanometers to 10 micrometers, so as to not affect the optical clarity of the protective sheet 126, while still providing a chemical barrier between the protective sheet and the LOCA to prevent migration of reactive species, such as photoinitiators. Accordingly, the barrier layer 212 prevents interaction of reactive species between the protective sheet substrate 210 and the LOCA 206 by inhibiting the reactive species from crossing the barrier layer 212. For instance, exposure to UV light may cause yellowing of the LOCA 206 and/or the protective sheet 126 when the LOCA 206 and the protective sheet 126 are in direct contact with one another. Accordingly, the barrier layer 212 of the surface treatment 216 prevents UV-triggered interaction and thereby prevents discoloration of the display 102. In some cases, the ceramic coating may be applied as the barrier layer 212 after the display 102 has been assembled. In other cases, the ceramic coating may be applied as the barrier layer 212 prior to assembling the protective sheet 126 with the FPL 204 and the substrate 202 to form the display 102.

In other examples, the barrier layer 212 may be applied using surface energy activation techniques such as plasma surface treatment, UV-light-ozone treatment, or surface thermal treatment to remove a layer of material and/or produce the barrier layer 212 on the surface 214 of the protective sheet 126. Examples of suitable plasma surface treatments that may be applied to the surface 214 of the protective sheet 126 to alter the surface properties will vary depending on whether the surface treatment is applied to the protective sheet before or after the protective sheet 126 is assembled to the display 102. For example, atmospheric/air plasma and atmospheric chemical plasma treatments may be used after assembly of the protective sheet 126 to the display 102, or prior to assembly of the display. On the other hand, corona treatment and flame plasma treatment may only be suitable for use prior to assembling the protective sheet 126 to the display 102 to avoid damaging the image-displaying component 128. The plasma treatment of the surface 214 may produce an oxide layer as the barrier layer 212 that is able to prevent migration of the reactive species between the LOCA 206 and the protective sheet 126 across the barrier layer 212, while not substantially affecting the optical clarity of the protective sheet 126. Additionally, or alternatively, applying the plasma treatment or other energy activation techniques mentioned above may remove a layer of material including reactive species from the surface 214 of the protective sheet 126. In addition, the plasma treatment may increase the adhesion between the protective sheet 126 and the LOCA 206, as compared to that with the untreated protective sheet 126.

Alternatively, a UV-light-ozone treatment may be used to provide the surface treatment 216 to alter the surface properties of the protective sheet 126 for forming the barrier layer 212. As one example, UV lamps may be used to cause the formation and decomposition of ozone adjacent to the surface 214 of the protective sheet 126, which in turn causes localized oxidation of the surface 214, thereby forming the barrier layer 212 as an oxide layer without substantially affecting the optical clarity of the protective sheet 126. The UV-light-ozone treatment may also remove material including reactive species from the surface 214 of the protective sheet. The UV-light-ozone process may be performed at low temperatures and therefore can be performed before or after the protective sheet 126 is assembled with the display 102.

In still other examples, other types of surface treatments 216 may be applied to the protective sheet 126 to create a barrier to migration of the reactive species and without substantially affecting the optical clarity of the protective sheet 126. For example, thermal treatment of the surface 214 of the protective sheet may be applied prior to assembly of the protective sheet 126 with the FPL 204 and the substrate 202. The thermal treatment may oxidize the surface 214 sufficiently to form an oxide layer as the barrier layer 212 to prevent migration of reactive species and/or may remove a layer of material including a reactive species from the surface of the protective sheet 126. Examples of suitable thermal treatment techniques include applying pulsed laser radiation to the surface 214.

Figure 3:
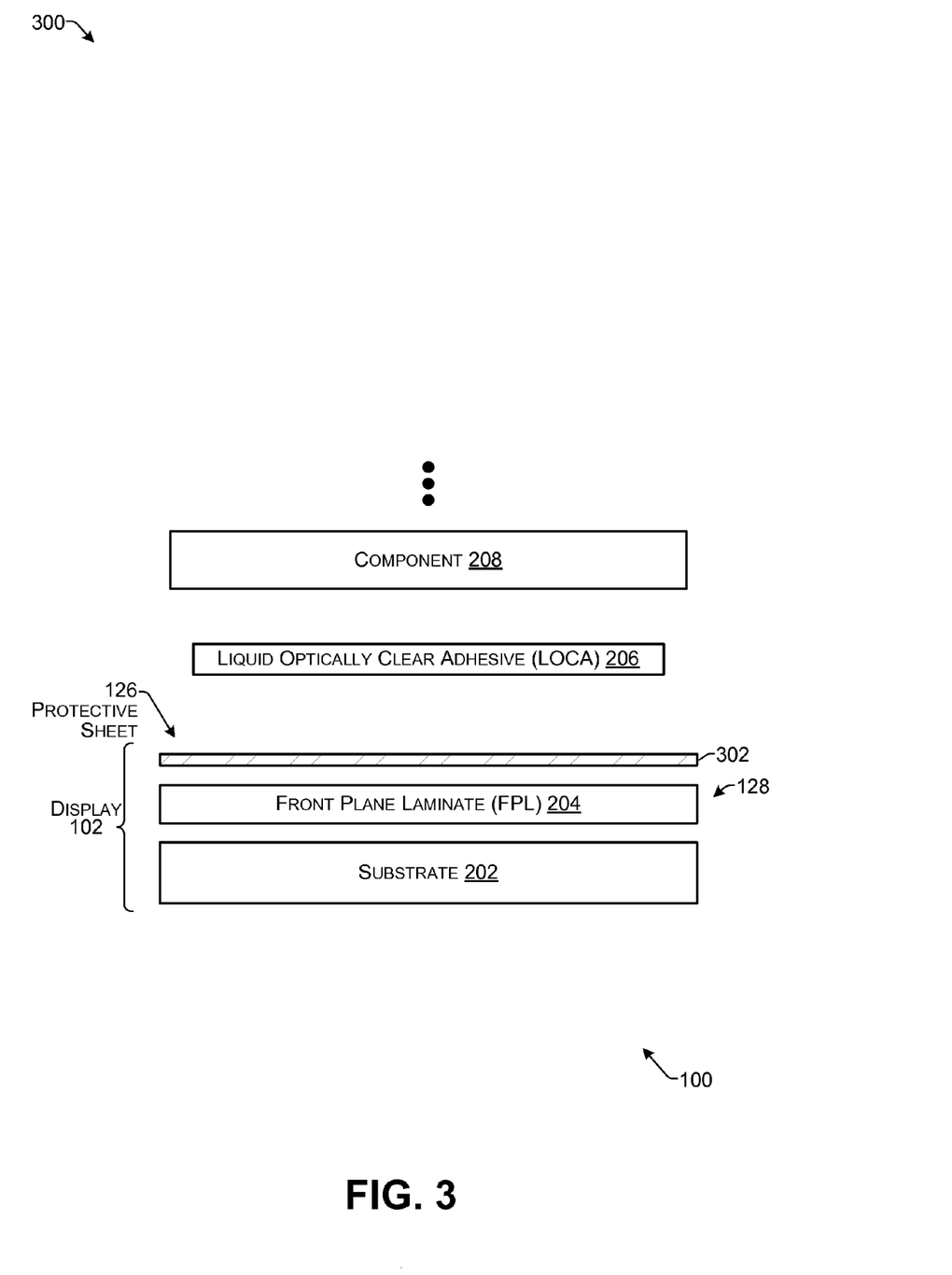
FIG. 3 illustrates an example schematic cross-section of the display assembly taken along line 2-2 of FIG. 1 according to some implementations.

FIG. 3 illustrates another example schematic cross-section of a display assembly 300 of the electronic device 100 taken along the line 2-2 from FIG. 1. In this example, rather than using a polymer substrate 210 for the protective sheet 126, the protective sheet 126 is formed from a thin flexible glass sheet 302, such as between 25 and 200 micrometers in thickness. The glass sheet 302 is not reactive with the photoinitiators in the LOCA, and does not itself include any photoinitiators or other reactive species. Accordingly, the display assembly 300 can be exposed to UV light without any discoloration of the LOCA 206 or the glass sheet 302. The glass sheet 302 may be assembled to the FPL 204 and the substrate 202 using any suitable techniques, as described above, to form the display 102. Additional components 208, such as components 106, 114 and 116, discussed above, may then be adhered to and stacked on the display 102 to form the display assembly 300. Furthermore, while several examples have been provided, other variations will be apparent to those of skill in the art having the benefit of the disclosure herein.

Figure 4:
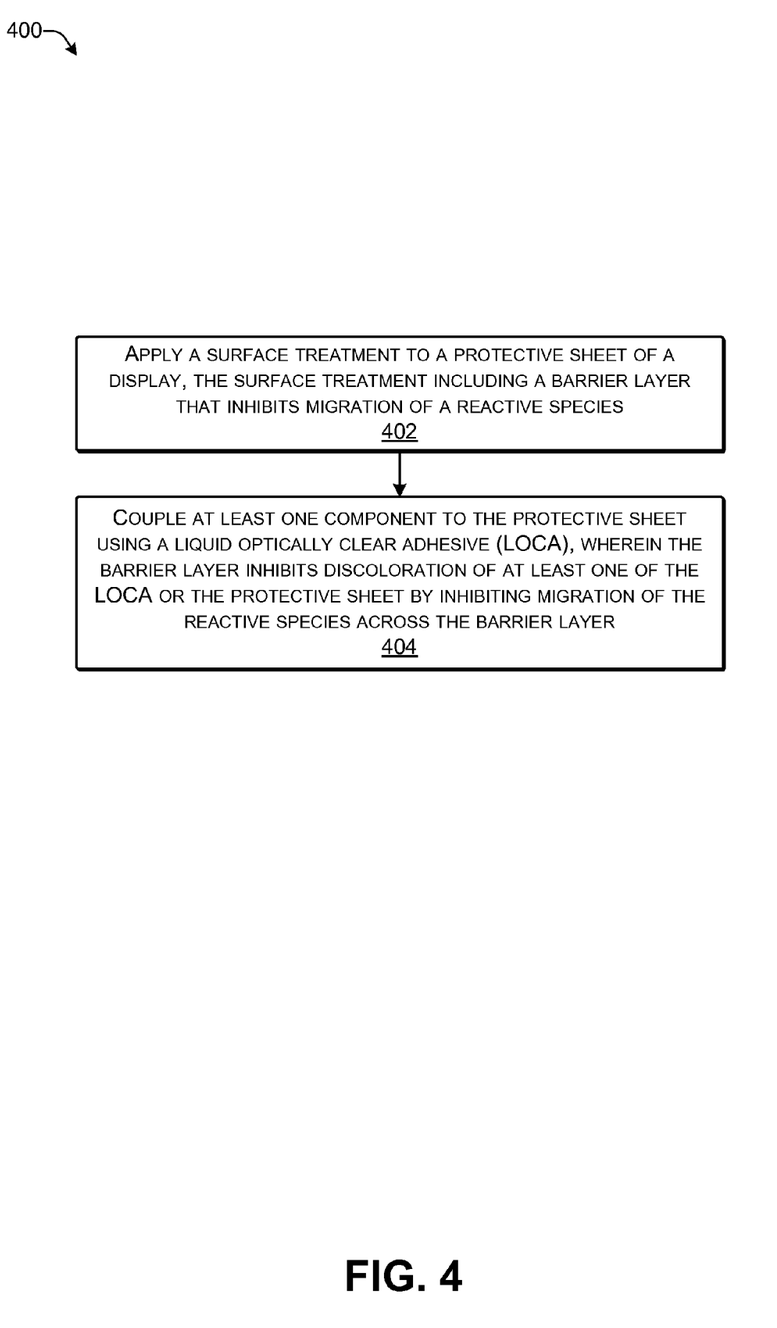
FIG. 4 illustrates a flow diagram of an example process for assembling an electronic device that includes a display having a protective sheet configured to inhibit discoloration according to some implementations.

FIG. 4 illustrates an example process 400 for assembling an electronic device 100 including the display 102 and at least one other component in a stack to form a display assembly as described herein. The order in which the operations are described is not intended to be construed as a limitation, and any number of the described operations can be combined in any order and/or in parallel to implement the process.

At 402, the process includes treating a protective sheet of a display with a surface treatment. The protective sheet may be surface treated before being assembled with the other elements of the display or after being assembled with the other elements of the display, depending on the type of surface treatment. As discussed above, suitable surface treatments include the barrier layer formed by at least one of: applying a ceramic material by vapor deposition or sputtering; plasma treatment of the outer surface of the protective sheet; UV-light-ozone oxidation treatment of the outer surface of the protective sheet; and/or surface thermal treatment of the outer surface of the protective sheet. The surface treatment barrier layer is formed in such a manner that the optical transparency of the protective sheet is not noticeably affected. Thus, the surface treatment may include a barrier layer to inhibit the migration of reactive species, such as a photoinitiator, between the protective sheet and the LOCA. Additionally, or alternatively, applying the surface treatment may include removal of material including reactive species from the outer surface of the protective sheet.

At 404, at least one component is coupled to the protective sheet using LOCA, and the barrier layer disposed on the protective sheet inhibits discoloration of at least one of the LOCA or the protective sheet by inhibiting migration of reactive species, such as a photoinitiator, across the barrier layer. For example, the barrier layer described herein may prevent the discoloration from occurring by preventing transfer of chemicals, such as photoinitiators and other reactive species, between the LOCA and the material of the protective sheet.

Figure 5:
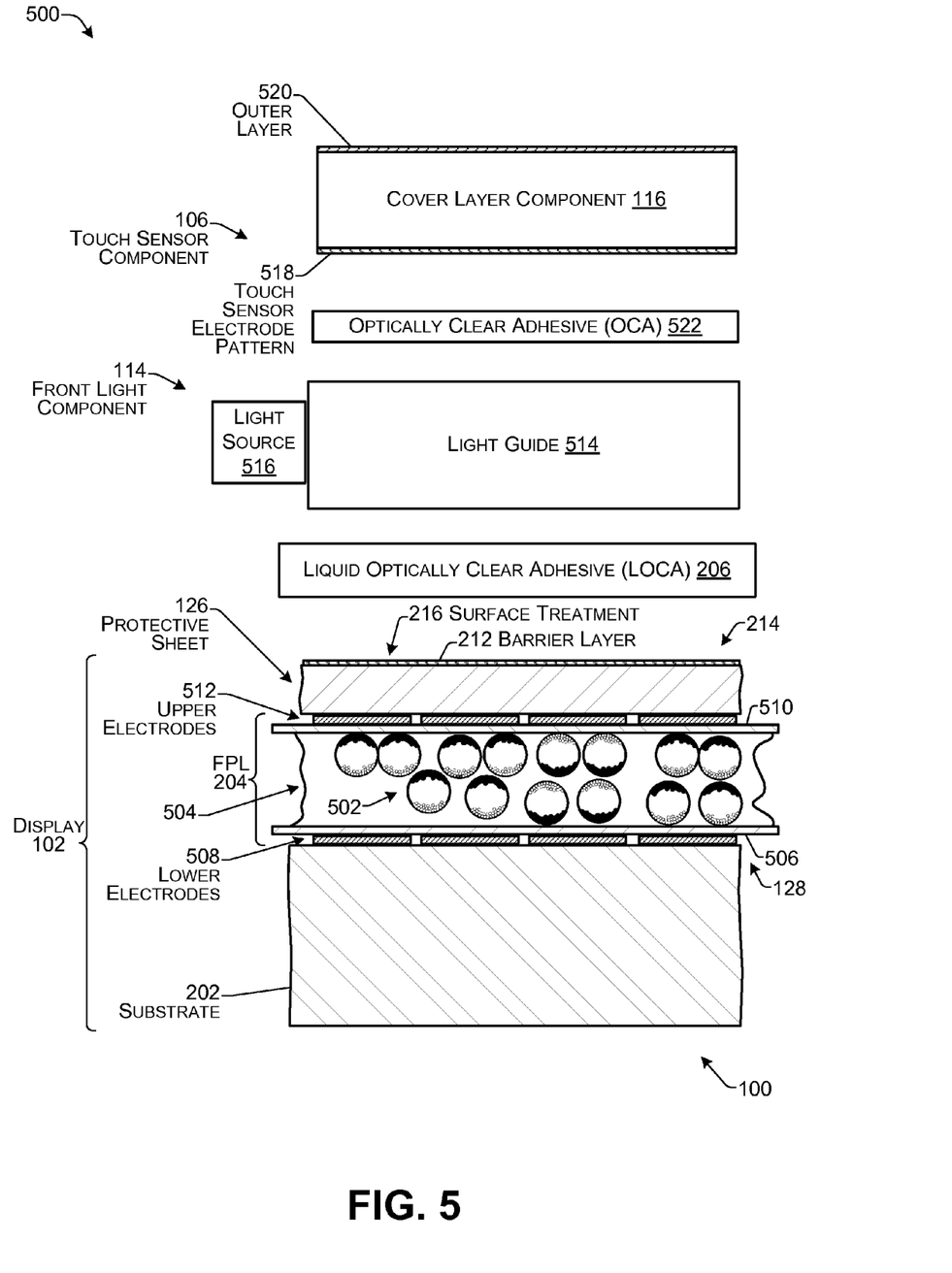
FIG. 5 illustrates an example schematic cross-section of the display assembly taken along line 2-2 of FIG. 1 according to some implementations.

FIG. 5 illustrates an example of a schematic cross-section of a component stack of a display assembly 500 of the electronic device 100 taken along line 2-2 from FIG. 1. As illustrated, the display 102 is a reflective display that includes the substrate 202, such as of glass or other suitable material, and a front plane laminate (FPL) 204, which serves as the image-displaying component 128. In this example, the FPL 204 includes capsules 502, as well as a fluid 504 in which the capsules 502 are suspended, as described above with reference to electronic-paper displays. In addition, the FPL 204 includes a lower plastic film 506 onto which the fluid 504 and capsules 502 are deposited, such as using a roll-to-roll process. A grid or pattern of lower electrodes 508 is associated with the lower plastic film 506. Similarly, an upper transparent plastic film 510 may be located on the upper side of the fluid 504 for containing the fluid 504 and the capsules 502. A grid or pattern of transparent upper electrodes 512 may be formed on or otherwise associated with the upper film 510. In some examples, the upper electrodes 512 may be formed from indium tin oxide or other suitable transparent conductive material. As one example, aligned pairs of the upper and lower electrodes 512 and 508, respectively, may each form a single pixel of the display 102. For instance, each capsule 502 may include dark and light particles inside the capsule 502. A positive charge on an electrode pair may cause a first color of particle to rise toward the upper plastic film 510 while a negative charge on an electrode pair may cause a second color of particle to rise toward the plastic film 510. The display controller 104, discussed above with respect to FIG. 1 may control the charge applied to each electrode pair. Furthermore, in some examples, the pixels (i.e., electrode pairs) may be controlled by applying a sequence of voltages to each pixel, instead of just a single value as in a typical LCD. These sequences of voltages may be referred to as "waveforms," and may be employed to prevent over-charging of the capsules 502, prevent damage to the capsules 502, and so forth.

As in the example of FIG. 2, the protective sheet 126 may be assembled atop the FPL 204, so that the FPL 204 is sandwiched between the protective sheet 126 and the substrate 202. Thus, the protective sheet 126, the FPL 204, and the substrate 202 may be assembled together to form the display 102. For instance, the display elements may be laminated together. Alternatively, a bezel or housing may be placed around the perimeter of the display elements, or other suitable manufacturing technique may be used for assembling the elements of the display 102.

In the example of FIG. 5, the protective sheet 126 includes the surface treatment 216 as discussed above. For example, the surface treatment 216 may include the barrier layer 212 formed by any of a ceramic coating, a plasma surface treatment, a UV-light-ozone surface treatment, a surface thermal treatment, or any other suitable treatment as discussed herein, or as will become apparent to those of skill in the art in light of the disclosure herein.

In the example of FIG. 5, the front light component 114 is coupled to the protective sheet 126 by LOCA 206 using any of the adhesive application and curing techniques discussed above with respect to FIG. 2. The front light component 114 includes a light guide 514 and a light source 516. As mentioned above, the light guide 514 may be a sheet of acrylic or other light-guiding material, and may have etchings, gratings or other patterns formed thereon for directing light from the light source 516 toward the FPL 204 for illuminating the display 102. The light source 516 may include one or more light emitting diodes or other suitable sources of illumination positioned on one or more edges of the light guide 514.

Further, in this example, the touch sensor component 106 may be integrated on the underside of the cover layer component 116. For example, a transparent touch sensor electrode pattern 518 may be formed on the underside of the cover layer opponent 116. As one example, the touch sensor electrode pattern 518 may be a grid of linear transparent electrodes formed on the underside of the cover layer substrate to function as a capacitive touch sensor.

In addition, the cover layer component 116 may include a outer layer 520 which may include at least one of an antiglare treatment, an antireflective treatment, an anti-smudge treatment, a crack-resistant treatment, a scratch-resistant treatment, a hard-coating, and the like. The cover layer component may be coupled to the upper side of the light guide 514 using an optically clear adhesive (OCA) 522. In some examples, the OCA 522 may be a solid OCA, while in other examples, the OCA 522 may be an LOCA. Accordingly, the display assembly 500 of FIG. 5 provides a reflective display 102 having a front light and touch input capability. The barrier layer 212 in this example prevents discoloration of the display that may otherwise be caused due to migration of reactive species between the protective sheet 126 and the LOCA 206. Further, while a particular example of a display assembly 500 has been described with respect to FIG. 5, numerous other display assembly configurations incorporating the surface treatment 216 will be apparent to those of skill in the art having the benefit of the disclosure herein. Furthermore, in other examples, the protective sheet 126 having a surface treatment 216 may be replaced with the thin glass sheet 302, as discussed above with respect to FIG. 3.

Figure 6:
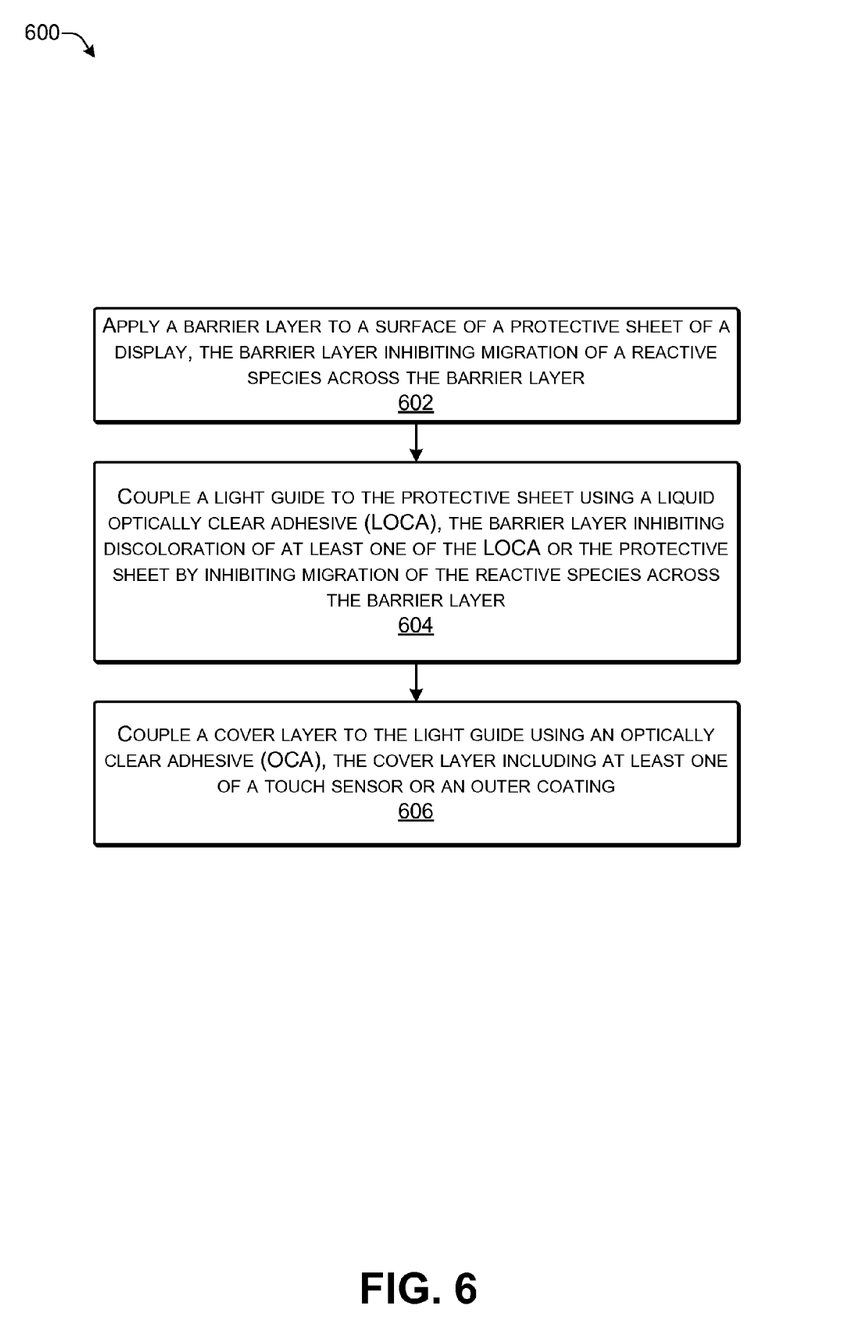
FIG. 6 illustrates a flow diagram of an example process for assembling an electronic device that includes a reflective display with a protective sheet configured to inhibit discoloration according to some implementations.

FIG. 6 illustrates an example process 600 for assembling an electronic device 100 including the display 102 and a plurality of other components in a stack to form a display assembly as described herein. The order in which the operations are described is not intended to be construed as a limitation, and any number of the described operations can be combined in any order and/or in parallel to implement the process.

At 602, the process includes applying a barrier layer to a surface of a protective sheet of a display, the barrier layer inhibiting migration of a reactive species across the barrier layer. For example, the protective sheet may be treated before being assembled with the other elements of the reflective display or after being assembled with the other elements of the reflective display, depending on the type of surface treatment. As discussed above, suitable treatments include applying a ceramic material by vapor deposition or sputtering; plasma treatment of the surface of the protective sheet; UV-light-ozone oxidation treatment of the surface of the protective sheet; and/or surface thermal treatment the surface of the protective sheet. The barrier layer may be formed in such a manner that the optical transparency of the protective sheet is not visibly affected. In addition, the barrier layer is sufficiently thick to inhibit migration of reactive species, such as a photoinitiator, between the protective sheet and the LOCA.

At 604, a light guide is coupled to the protective sheet using a LOCA, and the barrier layer of the protective sheet inhibits discoloration of at least one of the LOCA or the protective sheet by inhibiting migration of reactive species, such as a photoinitiator, across the barrier layer. For example, the barrier layer described herein may prevent the discoloration from occurring by preventing transfer of chemicals, such as photoinitiators and other reactive species, between the LOCA and the material of the protective sheet. Additionally, or alternatively, the surface treatment may remove a layer of material including the reactive species from the surface of the protective sheet. The light guide may have one or more light sources positioned to emit light into the light guide, and the light guide may include one or more features such as etchings or patterns for directing the light toward the reflective display, thereby illuminating the reflective display for viewing by a user.

At 606, a cover layer is coupled to the light guide using an optically clear adhesive. For example, the cover layer may include at least one of a touch sensor or an outer coating or surface treatment integrated with the cover layer. Thus, a transparent electrode grid may be formed on the cover layer such as for use as a capacitive touch sensor. Furthermore, the outer coating or surface treatment may be formed on the cover layer, and may include antiglare properties, antireflective properties, anti-smudge properties, anti-crack properties, anti-scratch properties, or various other suitable properties. The optically clear adhesive may be a solid OCA or a liquid OCA.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising:
    a display including a substrate, a front plane laminate able to produce an image, and a protective sheet of transparent polymer, wherein the substrate is coupled to a first side of the front plane laminate and a first side of the protective sheet is coupled to a second side of the front plane laminate that is opposite to the first side;
    a surface treatment on a second side of the protective sheet, the surface treatment comprising:
        a photoinitiator in contact with the second side of the protective sheet; and
        a barrier layer in contact with the photoinitiator, the barrier layer including at least one of a ceramic or an oxide;
    a liquid optically clear adhesive (LOCA) in contact with the barrier layer; and
    at least one of a light guide layer, a touch sensor layer, or a cover layer coupled directly to the LOCA;
    wherein the barrier layer inhibits discoloration of the LOCA by inhibiting migration of the photoinitiator across the barrier layer from the protective sheet to the LOCA.

2. The electronic device as recited in claim 1, wherein at least a portion of the protective sheet is removed during formation of the barrier layer on the second side of the protective sheet.

3. The electronic device as recited in claim 1, wherein:
    the barrier layer includes the oxide; and
    the oxide is formed on the second side of the protective sheet by at least one of:
        a plasma treatment applied to the photoinitiator;
        an ultraviolet-light-ozone treatment applied to the photoinitiator; or
        a thermal treatment applied to the photoinitiator.

4. The electronic device as recited in claim 1, wherein:
    the transparent polymer of the protective sheet comprises at least one of: a polyester, a polycarbonate, or an acrylic; and
    the protective sheet includes at least one of:
        an ultraviolet-light-absorbing dye including the photoinitiator; or
        a coating of a material different from the transparent polymer, the coating including the photoinitiator.

5. The electronic device as recited in claim 1, wherein the display comprises an electronic paper display.

6. The electronic device as recited in claim 1, wherein the barrier layer comprises the ceramic; and
    wherein the ceramic comprises at least one of aluminum oxide, silicon oxide, silicon nitride, titanium oxide, or magnesium oxide.

7. A method for assembling at least a portion of an electronic device, the method comprising:
    forming a photoinitiator in direct contact with a surface of a protective sheet of a display;
    forming a barrier layer in direct contact with the photoinitiator;
    applying a liquid optically clear adhesive (LOCA) in direct contact with the barrier layer; and
    coupling at least one component directly to the barrier layer using the LOCA, wherein the barrier layer inhibits discoloration of LOCA by inhibiting migration of a reactive species across the barrier layer between the protective sheet and the LOCA;
    wherein the barrier layer comprises at least one of a ceramic or an oxide.

8. The method as recited in claim 7, wherein the forming the barrier layer in direct contact with the photoinitiator comprises depositing an optically transparent layer of ceramic directly on the photoinitiator.

9. The method as recited in claim 8, wherein the ceramic comprises at least one of: aluminum oxide, silicon oxide, silicon nitride, titanium oxide, or magnesium oxide.

10. The method as recited in claim 7, wherein the forming the barrier layer in direct contact with the photoinitiator comprises at least one of:
   applying a plasma treatment to the photoinitiator;
   applying an ultraviolet-light-ozone treatment to the photoinitiator; or
   applying a thermal treatment to the photoinitiator.

11. The method as recited in claim 7, wherein the forming the barrier layer further comprises removing a portion of material that comprises the surface of the protective sheet.

12. The method as recited in claim 7, wherein the reactive species is the photoinitiator included in at least one of the protective sheet or a coating on the protective sheet.

13. The method as recited in claim 7, wherein coupling the at least one component to the barrier layer includes coupling at least one of:
   a lightguide layer to the barrier layer;
   a touch sensor layer to the barrier layer; or
   a cover glass layer to the barrier layer.

14. A display assembly comprising:
   a display including an image-displaying component;
   a transparent polymer protective sheet coupled directly to the image-displaying component, the protective sheet further comprising:
      a photoinitiator in direct contact with the transparent polymer sheet; and
      a barrier layer in direct contact with the photoinitiator;
   a liquid optically clear adhesive (LOCA) in direct contact with the barrier layer; and
   at least one other component coupled directly to the LOCA,
   wherein the barrier layer inhibits migration of the photoinitiator across the barrier layer between the protective sheet and the LOCA; and
   wherein the barrier layer comprises at least one of a ceramic or an oxide.

15. The display assembly as recited in claim 14, wherein the barrier layer is an optically transparent layer of ceramic disposed on an outer surface of the protective sheet.

16. The display assembly as recited in claim 14, wherein the barrier layer is an oxide layer disposed on an outer surface of the protective sheet.

17. The display assembly as recited in claim 14, wherein the barrier layer is formed by at least one of:
   a plasma treatment applied to the photoinitiator;
   an ultraviolet-light-ozone treatment applied to the photoinitiator; or
   a thermal treatment applied to the photoinitiator.

18. The display assembly as recited in claim 14, wherein a portion of the photoinitiator is removed during formation of the barrier layer on an outer surface of the protective sheet.

19. The display assembly as recited in claim 14, wherein:
   the display comprises an electronic paper display; and
   the at least one other component comprises a front light component for illuminating the display.

20. The display assembly as recited in claim 14, wherein the at least one other component includes at least one of:
   a lightguide layer;
   a touch sensor layer; or
   a cover glass layer.

21. The display assembly as recited in claim 14, wherein:
   the transparent polymer of the protective sheet comprises at least one of:
      a polyester, a polycarbonate, or an acrylic; and
   the protective sheet includes at least one of:
      an ultraviolet-light-absorbing dye that includes the photoinitiator; or
      a coating of a material different from the transparent polymer, the coating including the photoinitiator.

* * * * *